(12) United States Patent  (10) Patent No.: US 7,415,932 B1
Ngo  (45) Date of Patent: Aug. 26, 2008

(54) PORTABLE ARTICLE SUPPORT STRUCTURE

(76) Inventor: Van Huynh Ngo, 181 Skyview Way, San Francisco, CA (US) 94131

( * ) Notice: Subject to any disclaimer, the term of this patent is extended or adjusted under 35 U.S.C. 154(b) by 285 days.

(21) Appl. No.: 11/273,306

(22) Filed: Nov. 14, 2005

(51) Int. Cl.
*A47B 3/00* (2006.01)

(52) U.S. Cl. .............................. 108/44; 108/115; 108/4

(58) Field of Classification Search .............. 297/163, 297/191, 188.06, 146, 169, 188.05, 188.04, 297/188.2; 108/134, 135, 152, 42–44, 115, 108/4, 6; 224/926, 275; 296/37.15; 248/230.8, 248/456, 219.4
See application file for complete search history.

(56) References Cited

U.S. PATENT DOCUMENTS

| 905,836 | A | * | 12/1908 | Bowman | 312/233 |
| 1,452,915 | A | * | 4/1923 | Kennedy | 5/648 |
| 2,384,234 | A | * | 9/1945 | Breese | 297/2 |
| 2,822,968 | A | * | 2/1958 | Jackson | 224/275 |
| 3,065,992 | A | * | 11/1962 | Nagel | 297/423.46 |
| 3,318,456 | A | * | 5/1967 | Lipe | 211/72 |
| 3,452,372 | A | * | 7/1969 | Emery | 5/634 |
| 4,561,649 | A | * | 12/1985 | Forsythe | 482/80 |
| 4,585,196 | A | * | 4/1986 | Cormier | 248/214 |
| 4,819,568 | A | * | 4/1989 | Coffrin | 108/43 |
| 4,846,382 | A | * | 7/1989 | Foultner et al. | 224/483 |
| 5,244,255 | A | * | 9/1993 | Mill | 297/423.41 |
| D344,625 | S | * | 3/1994 | Berry | D12/416 |
| 5,427,292 | A | * | 6/1995 | Rousch | 224/275 |
| 5,687,893 | A | * | 11/1997 | Jacobsmeyer, Jr. | 224/275 |
| 5,799,913 | A | * | 9/1998 | Preston, Sr. | 248/146 |
| 2004/0155080 | A1 | * | 8/2004 | Fialla-Dori | 224/275 |

* cited by examiner

*Primary Examiner*—Janet M Wilkens
(74) *Attorney, Agent, or Firm*—Michael I Kroll (57) ABSTRACT

A foldable support structure serving as a work surface having apertures that may differ diametrically for support of containerized articles, such as beverages. The foldable support structure has three hinged planar sections with the center section having the aforementioned apertures and the left and right sections incorporating means for fixedly engaging each other. Mating straps extend substantially from a hinged joint and from a section base whereby said foldable support can be suspended from a structure, such as a motor vehicle seat. Tongue and slots positioned on opposing section ends provide means for selectively varying the pitch of the work surface. The device can be used as a free standing table for bed or beach having selectively engageable locking mechanisms positioned on the four corners of the center section and normally in a disengaged position so that the left and right sections are free to move to a user selective engagement between tab and slot.

9 Claims, 12 Drawing Sheets

PORTABLE ARTICLE SUPPORT STRUCTURE

BACKGROUND OF THE INVENTION

1. Field of the Invention

The present invention relates generally to supports and, more specifically, to a foldable support structure serving as a worksurface having apertures that may differ diametrically for support of containerized articles, such as beverages. The foldable support structure has three hinged planar sections with the center section having the aforementioned apertures and the left and right sections incorporating means for fixedly engaging each other. Mating straps extend substantially from a hinged joint and from a section base whereby said foldable support can be suspended from a structure, such as a motor vehicle seat. Tongue and slots positioned on opposing section ends provide means for selectively varying the pitch of the worksurface.

Furthermore, the device can be used as a free standing table for bed or beach having selectively engageable locking mechanisms positioned on the four corners of the center section and normally in a disengaged position so that the left and right sections are free to move to a user selective engagement between tongue and slot.

To be used as a table the left and right sections are moved to a right angle position relative to the middle section and the locking mechanisms are slidably moved toward the interior whereupon the slots on the underside of the locking mechanism engage the left and right sections respectively in a locked position until selectively released.

Additionally, the present invention provides for one or more appropriately sized optional pockets fixed to the exterior of the left and/or right adjustable sections whereby magazines can be stored therein.

2. Description of the Prior Art

There are other worksurface devices designed for supports. Typical of these is U.S. Pat. No. 1,277,781 issued to Trammell on Sep. 3, 1918.

Another patent was issued to Bell, et al. on Apr. 10, 1956 as U.S. Pat. No. 2,741,521. Yet another U.S. Pat. No. 2,898,170 was issued to Antonius on Aug. 4, 1959 and still yet another was issued on Apr. 24, 1962 to Sawle III as U.S. Pat. No. 3,031,242.

Another patent was issued to Miller on Sep. 13, 1988 as U.S. Pat. No. 4,770,107. Yet another U.S. Pat. No. 5,551,616 was issued to Stitt, et al. on Sep. 3, 1996. Another was issued to Sutton on Sep. 16, 1997 as U.S. Pat. No. 5,667,272 and still yet another was issued on Oct. 26, 1999 to White as U.S. Pat. No. 5,973,917.

Another patent was issued to White on Jul. 30, 2002 as U.S. Pat. No. 6,426,869. Yet another U.S. Pat. No. 6,796,473 was issued to Purpura on Sep. 28, 2004. Another was issued to Baxter on Jun. 5, 1985 as U.K. Patent No. GB2148703 and still yet another was issued on Mar. 31, 1994 to Stamper as International Patent Application No. WO 94/06647.

U.S. Pat. No. 1,277,781

Inventor: William H. Trammell

Issued: Sep. 3, 1918

In a hammock structure adapted for suspension in a vehicle tonneau, the combination of an elongated body portion of a length equal substantially to the width of the tonneau, and having a hem at each end, a foot flap at one end and side flaps at the opposite longitudinal edges of the body portion, supports threaded through said hems and adapted to be secured at opposite ends to the sides of the tonneau, and to be drawn taut longitudinally of the hems to stretch the body portion into U.S. Pat. No. 2,741,521

Inventor: Bernie F. Bell, et al.

Issued: Apr. 10, 1956

A portable tray comprising a pan having an upstanding flange with slots therein, bowed foldable and rotatable arms having parts adapted to swing up and down out of and into the slots, outrigger supports on the lower part of the pan at the slots, bearings pivoted to the supports in which the arms are rotatable, and parts movable with the bearings adapted to abut the flange about the slots when the bearings are moved to erect position.

U.S. Pat. No. 2,898,170

Inventor: John I. Antonius

Issued: Aug. 4, 1959

An automobile table composed of a tray, a pair of supporting beams upon which said tray is mounted, said supporting beams being provided with a hook on one end, said hook being substantially U shaped in cross section and designed to attach to the instrument panel of an automobile, a plurality of threaded bolts covered on one end by rubber knobs or suction cups, said bolts being designed to be interchangeably installed in a plurality of aligned perforations in said supporting beams, a plurality of threaded nuts designed to retain said bolts in a predetermined position, a horizontal supporting bar provided with a pivot on each end, said pivots being designed to be installed in a pair of aligned perforations in said supporting beams, a leg member provided with a recess in one end, said recess being designed to coact with a similar recess in the mid-portion of said supporting bar providing a mechanism whereby said leg member may be detachably mounted on said supporting bar, a leg member provided with a box structure designed to slidably enclose previously said leg member, said box structure being provided with a set screw by means of which said leg members may be locked in a predetermined position.

U.S. Pat. No. 3,031,242

Inventor: William S. Sawle III

Issued: Apr. 24, 1962

In a two-part, portable automobile desk, in combination, a back part adapted to be supported in an upright position on the back rest of an automobile seat, and a base part adapted to be supported in an approximately horizontal position on the seat cushion of the seat, said back part comprising a generally rectangular U-shape frame formed of cylindrical rod stock and including a pair of spaced parallel side members and a straight connecting bight portion, the free ends of said side members being provided with reentrant hook portions adapted to extend over the upper edge of the back rest to support the frame in an upright position against the forwardly facing surface of the back rest, said base part comprising a flat generally rectangular sheet of rigid material having its inner edge region hingedly connected to said bight portion for swinging movement about the axis thereof, a pliable, flat flexible sheet of plastic material extending between and having its side edges secured to said parallel side members throughout substantially their entire length exclusive of the reentrant hook portions thereof, and an additional pliable flexible sheet of plastic material secured to said first-mentioned sheet of plastic material and defining, in combination therewith, an article-receiving pocket, and a supporting leg hingedly connected to the distal edge region of the rigid sheet for swinging movement between an inoperative collapsed position wherein it lies flush against the back side of the sheet and an operative extended position wherein it extends substantially normal to the sheet, the hinge connection between the sheet and bight portion of the back part being adapted to support the inner end of the sheet above the level of the seat cushion, and the leg, when extended, being adapted to rest upon the seat cushion and to support the outer end of the sheet above the level of the seat cushion when the back part is in operative position on the back rest, said front part being capable of swinging movement toward and away from the back part whereby the two parts may be folded against each other in substantially coplanar relationship.

U.S. Pat. No. 4,770,107

Inventor: Deborah S. Miller

Issued: Sep. 13, 1988

A portable and collapsible travel tray assembly is provided for mounting in conjunction with a conventional automobile seat positioned to the front of the user of the tray and the seat of the user, particularly a child's car seat. The portable tray assembly comprises a rigid bottom panel member having front, back, and side portions. The bottom panel member is provided with a pair of opposing folding side panels which extend along the side portions of the bottom panel and above the plane of the bottom panel when in the unfolded position. The tray assembly also includes a front folding panel extending between the opposing side panels and along the front portion of the bottom panel and above the plane of said bottom panel. The folding side and front panels permit the tray to be converted from a stowed or collapsed position when the side and front panels are in the folded or stowed position to a position of use when in the unfolded position. The opposing side panels include flexible arm members which extend beyond the front portion of the bottom panel and attach to front suspension means for supporting the front portion of the tray. A back suspension means is attached to the back portion of the bottom panel whereby the front and back suspension means coact to hold the tray in level position. When so mounted the tray is particularly adapted to serve as a small travel tray for the reception of articles in a position where it is readily accessible to a child, for example, seated in a car seat.

U.S. Pat. No. 5,551,616

Inventor: Robert N. Stitt

Issued: Sep. 3, 1996

A universal vehicle organizing container for automobiles and trucks which sits on the right of a driver, and contains specialized surfaces for holding items necessary for a traveling businessman, such as laptop computer, cellular phone, and more. The container is secured to the seat back by means of a strap which can also act as a carrying means. The inside of the container is insulated and partitioned, so that items may be carried securely, and food items will stay hot or cold longer. The container is connected by dual wires to the vehicle's cigarette lighter socket, and multiple cigarette lighter type adapters are located on the top surface of the container to power electronic devices.

U.S. Pat. No. 5,667,272

Inventor: Michael Sutton

Issued: Sep. 16, 1997

A platform assembly is provided for use in combination with a vehicle including a vehicle seat having a seat bottom, seat back, and a head rest. The platform assembly is supported by the seat to carry articles for ready access by an occupant of the vehicle. The platform assembly includes a platform defining a flat slip-resistant surface area for supporting articles thereon, and for preventing substantial shifting of the articles while the vehicle is in motion. An adjustable attachment strap is secured to a back end of the platform, and extends upwardly from the platform adjacent to the seat back for removable attachment to the headrest. The attachment strap permits leveling adjustment of the platform, and unobstructed access by the vehicle occupant to the articles supported on the platform.

U.S. Pat. No. 5,973,917

Inventor: M. Gerald White

Issued: Oct. 26, 1999

The present invention is a portable work station which is designed to be used in motor vehicles. The work station is a cabinet which is capable of being secured to a passenger seat of the motor vehicle, preferably by an attached securing means. There is provided a computer tray which is adapted to be releasable attachable to the work surface of the work station and capable of being received within the interior of the work station. An alternate embodiment of the present invention provides a computer tray which is attached to an articulated cantilever system which, when the lid to the main compartment is opened, projects and presents the computer tray and any computer which is secured thereon.

U.S. Pat. No. 6,426,869

Inventor: Gerald White

Issued: Jul. 30, 2002

The present invention is a portable work station which is designed to be used in motor vehicles. The work station is a cabinet which is capable of being secured to a passenger seat of the motor vehicle, preferably by an attached securing means. There is provided a computer tray which is adapted to be releasable attachable to the work surface of the work station and capable of being received within the interior of the work station. An alternate embodiment of the present invention provides a computer tray which is attached to an articulated cantilever system which, when the lid to the main compartment is opened, projects and presents the computer tray and any computer which is secured thereon.

U.S. Pat. No. 6,796,473

Inventor: William J. Purpura

Issued: Sep. 28, 2004

A laptop computer transport and support system for a mobile environment such as an airplane, bus or train is embodied as a wheeled clamshell style backpack carrying case with a retractable handle. The system is employed by unzipping three case edges and lifting a hinged protective cover thereby exposing a computer. The backpack straps unhook from the cover and secure to a user's seatback or around a user's headrest while strap posts at an opposite backpack strap end extend from the case and prevent strap interference with the user. A foldable or detachable handle permits retractable handle posts to extend on each side of the user and support the system against the seatback instead of the user when the system is used. Optionally, computer peripherals within a compartmentalized base are connected within the base to a docking station port and provide the computer with quick access to the peripherals.

U.K. Patent Number GB2148703

Inventor: Robert Ogilvie Baxter

Issued: Jun. 5, 1985

A vehicle desk unit comprises a base 1 with hinged support members 2 at both ends foldable under the base 1. A document presentation board 8 is hinged to one side edge of the base and is foldable over the base. To the other side edge is hinged a strut 9 foldable over the base and releasably connectable to the board 8 along their unhinged edges by meshing plastics strips 10 or press studs. A spring-held document clip 11 is attached to the board 8. Two eyelets 7 are secured to the base under the sides thereof to provide attachment points for the hooked ends 6 of a resilient strap 5. In use, one of the support members 2 is folded down to project from the base 1, and the bottom edge rests upon the rear end of a vehicle seat cushion 3, whose front end is higher and supports the other end of the base 1. One hooked end 6 of the strap 5 is disengaged from its eyelet 7 and passed around the back 4 of the seat and re-engaged with its eyelet 7, so that the strap is stretched and holds the end of the base against the seat back 4.

International Patent Application Number WO 94/06647

Inventor: James Stamper

Published: Mar. 31, 1994

A desk in the form of a board having releasable connection means adapted to connect the board with a fixture in a vehicle so that the board can move between a first out-of-use position in which it lies flat against the fixture and a second in-use position in which it extends outwardly of the fixture.

While these supports may be suitable for the purposes for which they were designed, they would not be as suitable for the purposes of the present invention, as hereinafter described.

SUMMARY OF THE PRESENT INVENTION

A primary object of the present invention is to provide a worksurface mountable to a support.

Another object of the present invention is to provide a worksurface that can be fastened to a motor vehicle seat.

Yet another object of the present invention is to provide a worksurface having three planar sections interconnected by a living hinge.

Still yet another object of the present invention is to provide a worksurface wherein the middle section has a plurality of apertures that can differ diametrically and serve as receptacle for beverage containers Another object of the present invention is to provide a worksurface wherein the left and right sections have means for lockingly engaging eachother.

Yet another object of the present invention is to provide a worksurface wherein the left and right sections have a plurality of slots for receiving a tab therein.

Yet another object of the present invention is to provide a worksurface wherein the left and right sections have one or more appropriately sized optional pockets fixed to the exterior for the storage of magazines therein.

Additional objects of the present invention will appear as the description proceeds.

The present invention overcomes the shortcomings of the prior art by providing a foldable support structure serving as a worksurface having apertures that may differ diametrically for support of containerized articles, such as beverages. The foldable support structure has three hinged planar sections with the center section having the aforementioned apertures and the left and right sections incorporating means for fixedly engaging each other. Mating straps extend substantially from a hinged joint and from a section base whereby said foldable support can be suspended from a structure, such as a motor vehicle seat. Tongue and slots positioned on opposing section ends provide means for selectively varying the pitch of the worksurface. The device can be used as a free standing table for bed or beach having selectively engageable locking mechanisms positioned on the four corners of the center section and normally in a disengaged position so that the left and right sections are free to move to a user selective engagement between tab and slot.

To be used as a table the left and right sections are moved to a right angle position relative to the middle section and the locking mechanisms are slidably moved toward the interior whereupon the slots on the underside of the locking mechanism engage the left and right sections respectively in a locked position until selectively released.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar references characters denote similar elements throughout the several views, the figures illustrate the Foldable Support Structure of the present invention. With regard to the reference numerals used, the following numbering is used throughout the various drawing figures.

10 Foldable Support Structure
12 center support plate
14 rear support plate
16 front apertures
18 cup apertures
20 strap
22 buckle
24 hinge
26 sliding lock
28 hook and eye fastener
30 slot
32 tongue
34 pocket
36 net
38 lock mechanism
40 lock slot
42 nubs
44 nub sockets
46 user

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
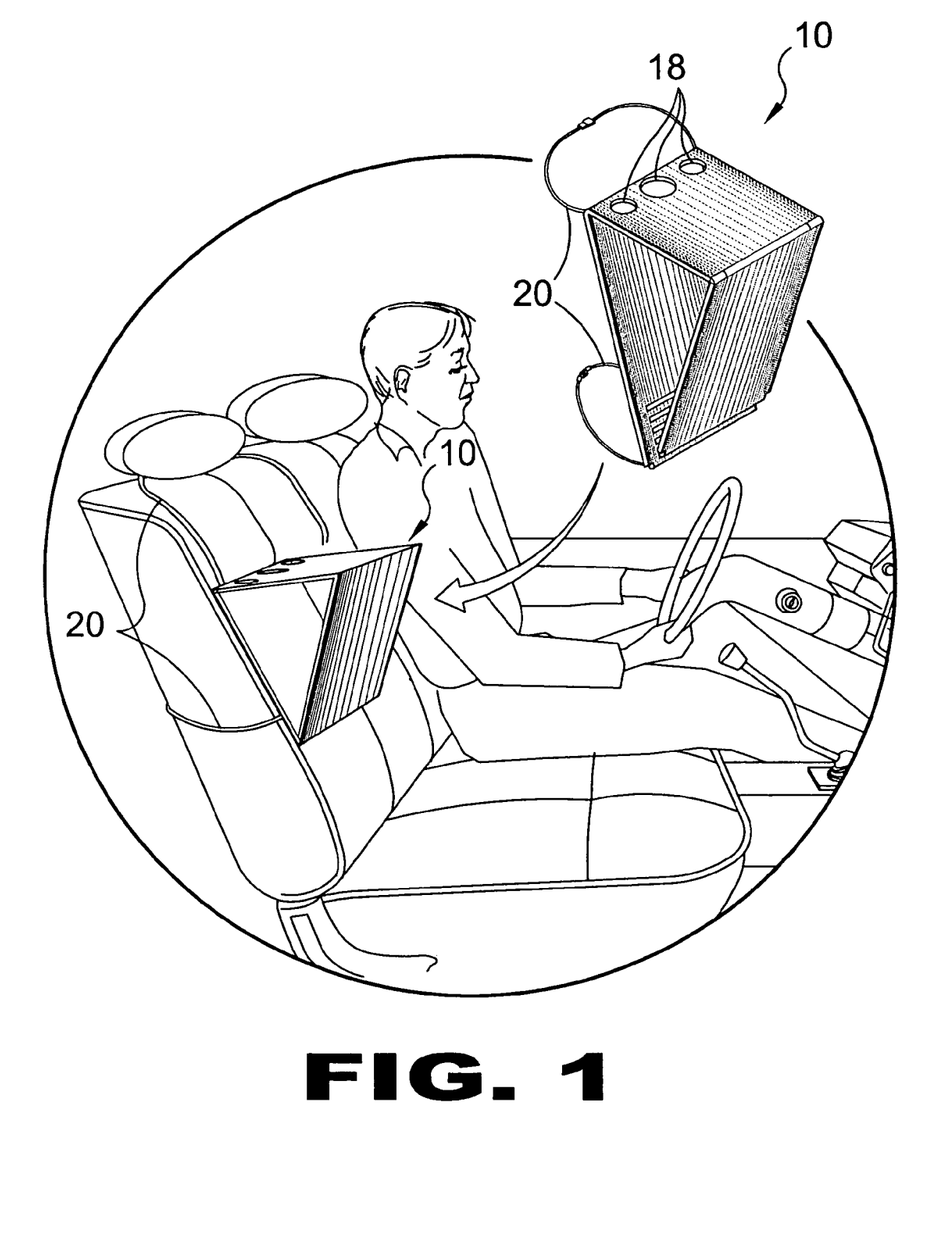
FIG. 1 is an illustrative view of the present invention in use.

FIG. 1 is an illustrative view of the present invention 10 in use. The present invention 10 is a foldable support structure 10 serving as a work surface having apertures 18 that may differ diametrically for support of containerized articles, such as beverages. The foldable support structure has three hinged planar sections with the center section having the aforementioned apertures and the left and right sections incorporating means for fixedly engaging each other. Mating straps 20 extend substantially from a hinged joint and from a section base whereby said foldable support can be suspended from a structure, such as a motor vehicle seat. Tongue and slots positioned on opposing section ends provide means for selectively varying the pitch of the work surface. Furthermore, the device can be used as a freestanding table for bed or beach. Additionally, the present invention 10 provides for one or more appropriately sized optional pockets fixed to the exterior of the left and/or right adjustable sections whereby magazines can be stored therein.

Figure 2:
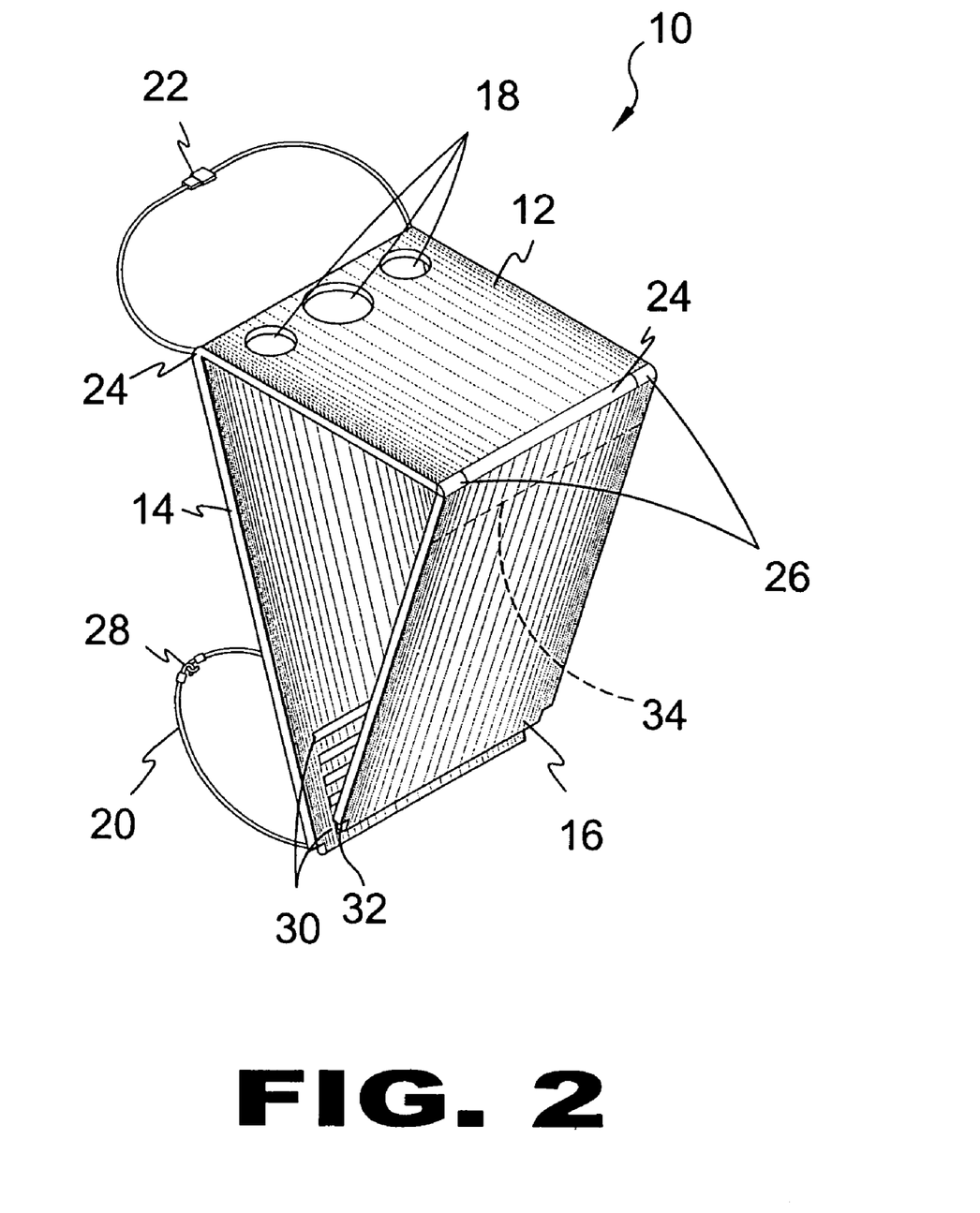
FIG. 2 is a perspective view of the present invention.

FIG. 2 is a perspective view of the present invention 10. Shown is a perspective view of the present invention 10, a foldable work surface 10 having apertures 18 that support containerized beverages. The foldable support structure has three hinged planar sections with the center section 12 having the aforementioned apertures and the front 16 and right 14 sections incorporating means for fixedly engaging each other. Mating straps 20 extend substantially from a hinged joint 24 and from a section base whereby said foldable support can be suspended from a structure, such as a motor vehicle seat. The straps 20 include securing means such as a clip buckle 22 and a hook and eyelet fastener 20. Tongue 32 and slots 30 positioned on opposing section ends provide means for selectively varying the pitch of the work surface of the center plate 12. Furthermore, the device can be used as a freestanding table for bed or beach. An optional pocket 34 may be incorporated in the front support plate 16.

Figure 3:
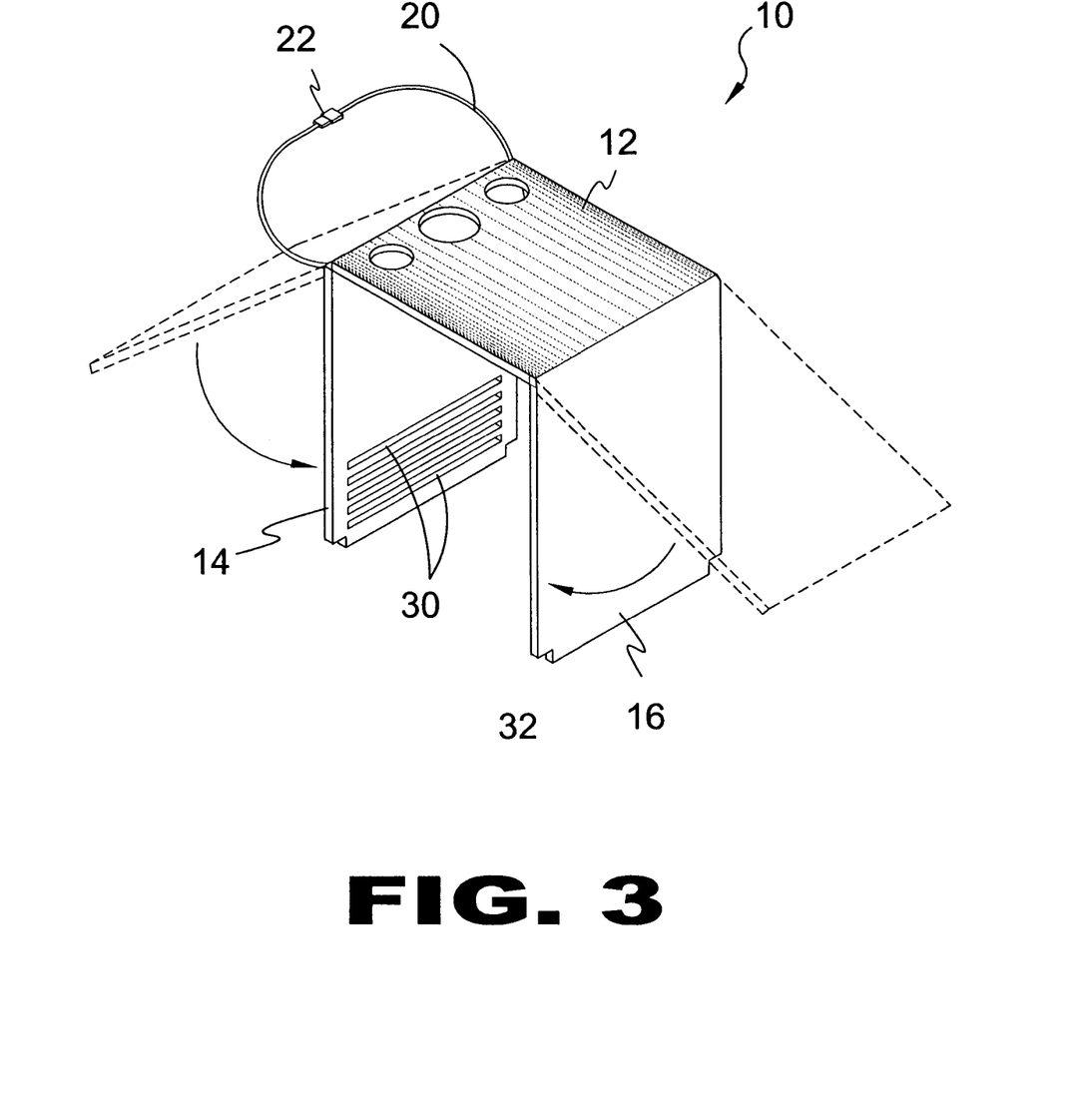
FIG. 3 is a perspective view of the present invention in a folding position.

FIG. 3 is a perspective view of the present invention 10 in a folding position. The foldable work surface 10 comprises front 16 and rear 14 adjustable sections with a central section 12 or work surface hingedly positioned therebetween. The device provides strap means 22 with a clip buckle 22 for suspending the device from a vehicle seat. The desk also provides straps 20 spaced away from the suspension strap for additional support. The opposing edges of the support sections provide selectively engaging tongue 32 and slot 30 members whereby the pitch of the work surface can be varied.

Figure 4:
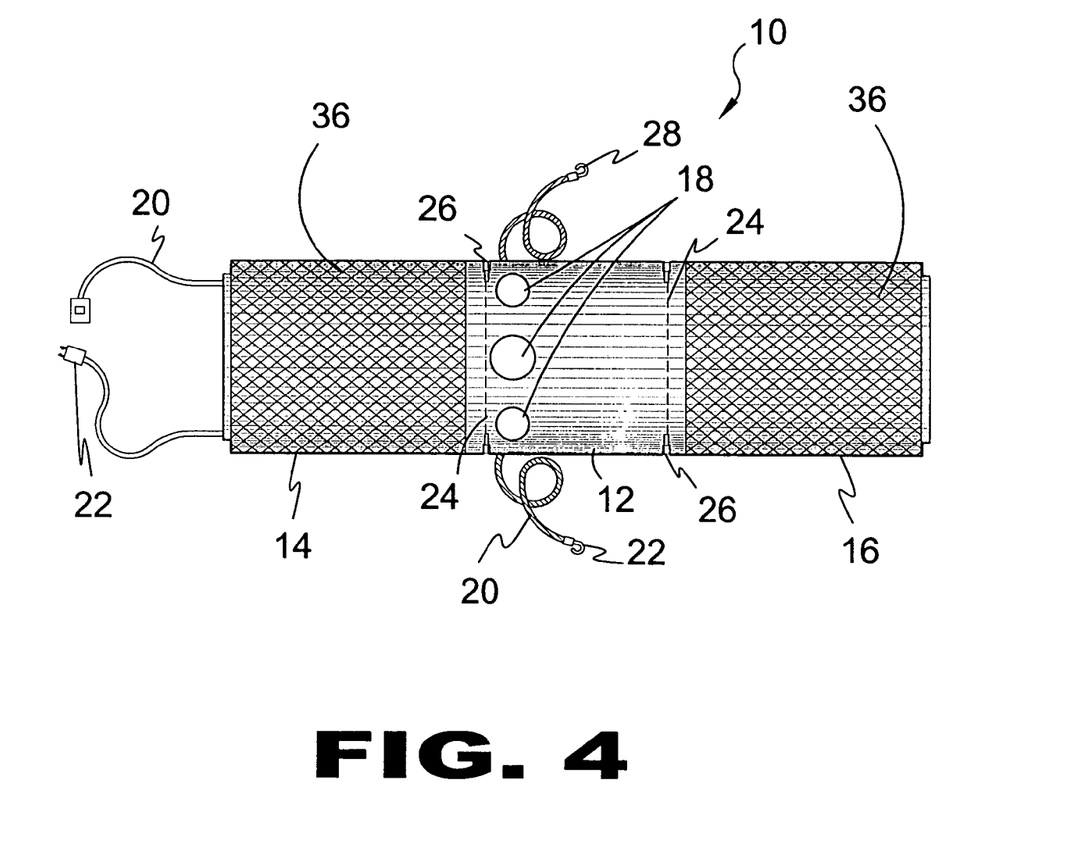
FIG. 4 is a top view of the present invention.

FIG. 4 is a top view of the present invention 10. The foldable work surface 10 comprises front 16 and rear 14 adjustable sections with a central section 12 or work surface hingedly positioned therebetween. The device provides strap means 22 with a clip buckle 22 for suspending the device from a vehicle seat. The desk also provides straps 20 spaced away from the suspension strap for additional support. Additionally, the present invention provides for one or more appropriately sized optional pocket nets 36 fixed to the exterior of the left and/or right adjustable sections whereby magazines can be stored therein.

Figure 5:
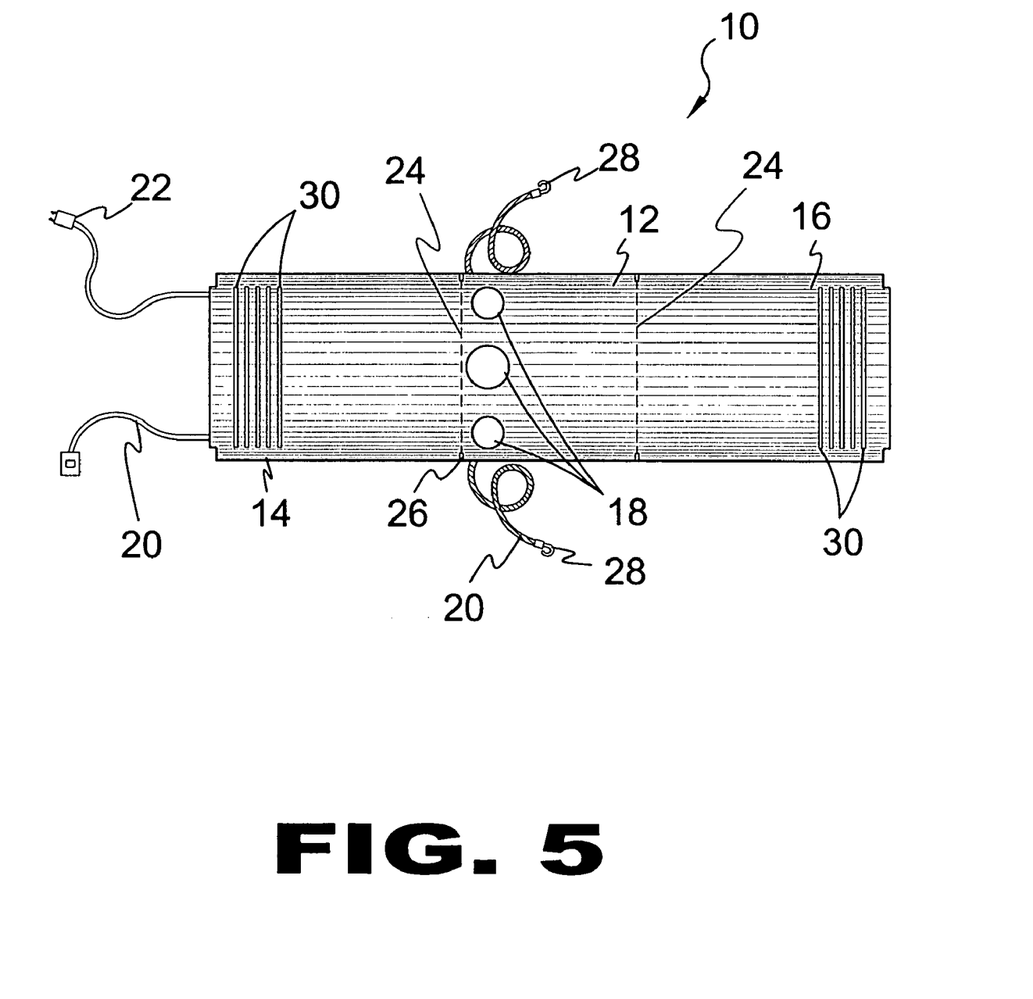
FIG. 5 is a bottom view of the present invention.

FIG. 5 is a bottom view of the present invention 10. Shown is a bottom view of the present invention 10. A foldable support structure 10 having apertures 18 that support containerized beverages. The foldable support structure has three hinged planar sections with the center section 12 having the aforementioned apertures and the front 16 and right 14 sections incorporating means for fixedly engaging each other. Mating straps 20 extend substantially from a hinged joint 24 and from a section base whereby said foldable support can be suspended from a structure, such as a motor vehicle seat. The straps 20 include securing means such as a clip buckle 22 and a hook and eyelet fastener 20. Tongue 32 and slots 30 positioned on opposing section ends provide means for selectively varying the pitch of the work surface of the center plate 12. Furthermore, the device can be used as a freestanding table for bed or beach. An optional pocket 34 may be incorporated in the front support plate 16.

Figure 6:
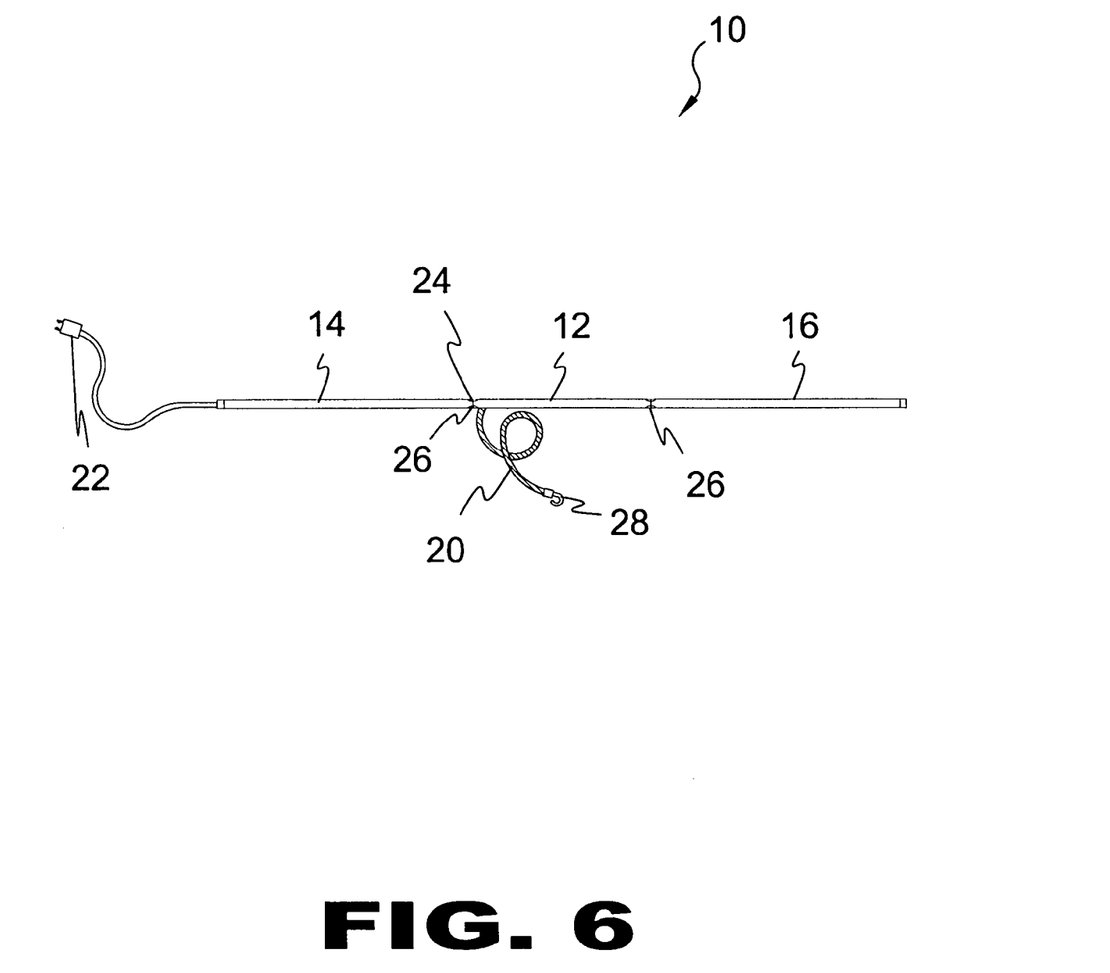
FIG. 6 is a side view of the present invention.

FIG. 6 is a side view of the present invention 10. Shown is a side view of the present invention. A foldable support structure 10 having apertures 18 that support containerized beverages. The foldable support structure has three hinged planar sections with the center section 12 having the aforementioned apertures and the front 16 and right 14 sections incorporating means for fixedly engaging each other. Mating straps 20 extend substantially from a hinged joint 24 and from a section base whereby said foldable support can be suspended from a structure, such as a motor vehicle seat. The straps 20 include securing means such as a clip buckle 22 and a hook and eyelet fastener 20. Tongue 32 and slots 30 positioned on opposing section ends provide means for selectively varying the pitch of the work surface of the center plate 12. Furthermore, the device can be used as a freestanding table for bed or beach.

Figure 7:
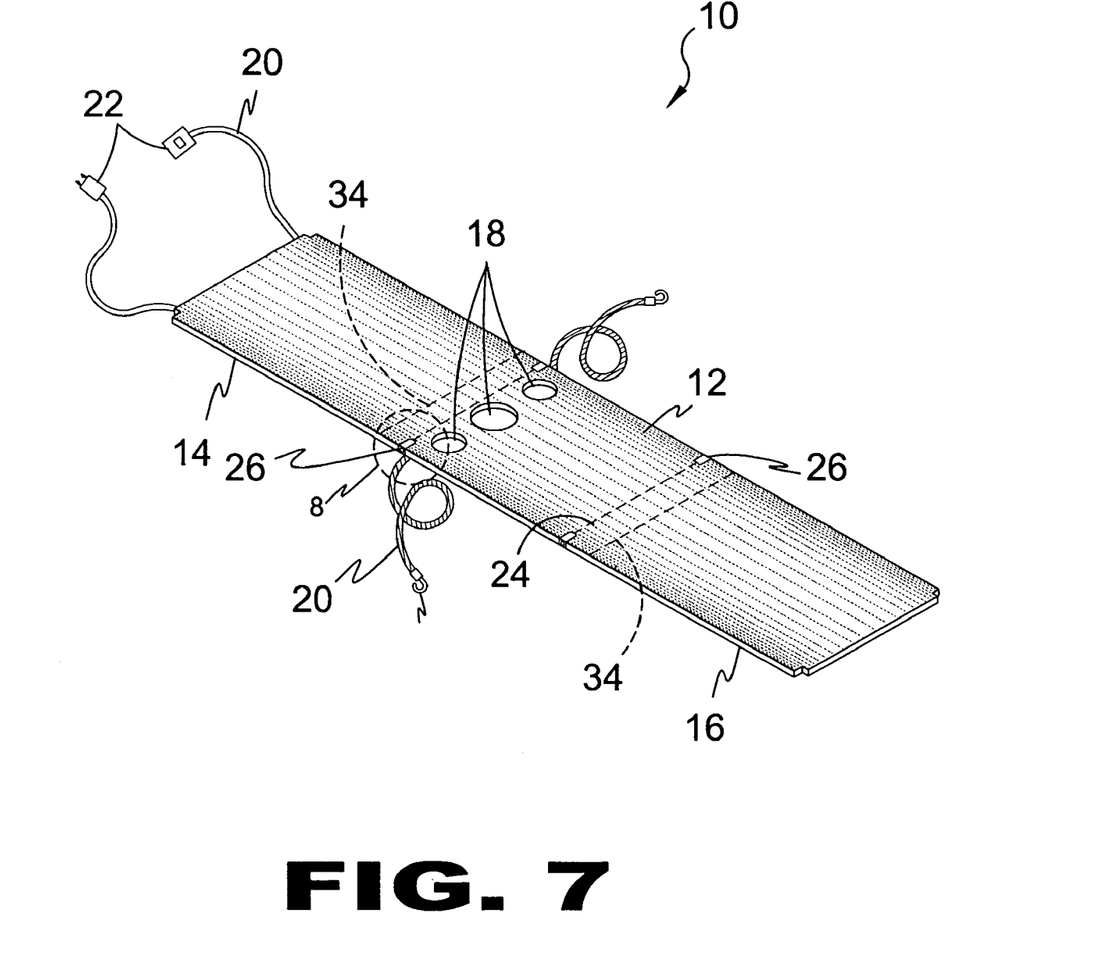
FIG. 7 is a perspective view of the present invention in an unfolded position.

FIG. 7 is a perspective view of the present invention in an unfolded position. The foldable work surface 10 having apertures 18 that support containerized beverages. The foldable support structure has three hinged planar sections with the center section 12 having the aforementioned apertures and the front 16 and right 14 sections incorporating means for fixedly engaging each other. Mating straps 20 extend substantially from a hinged joint 24 and from a section base whereby said foldable support can be suspended from a structure, such as a motor vehicle seat. The straps 20 include securing means such as a clip buckle 22 and a hook and eyelet fastener 20. Furthermore, the device can be used as a freestanding table for bed or beach. An optional pocket 34 may be incorporated in the front support plate 16.

Figure 8:
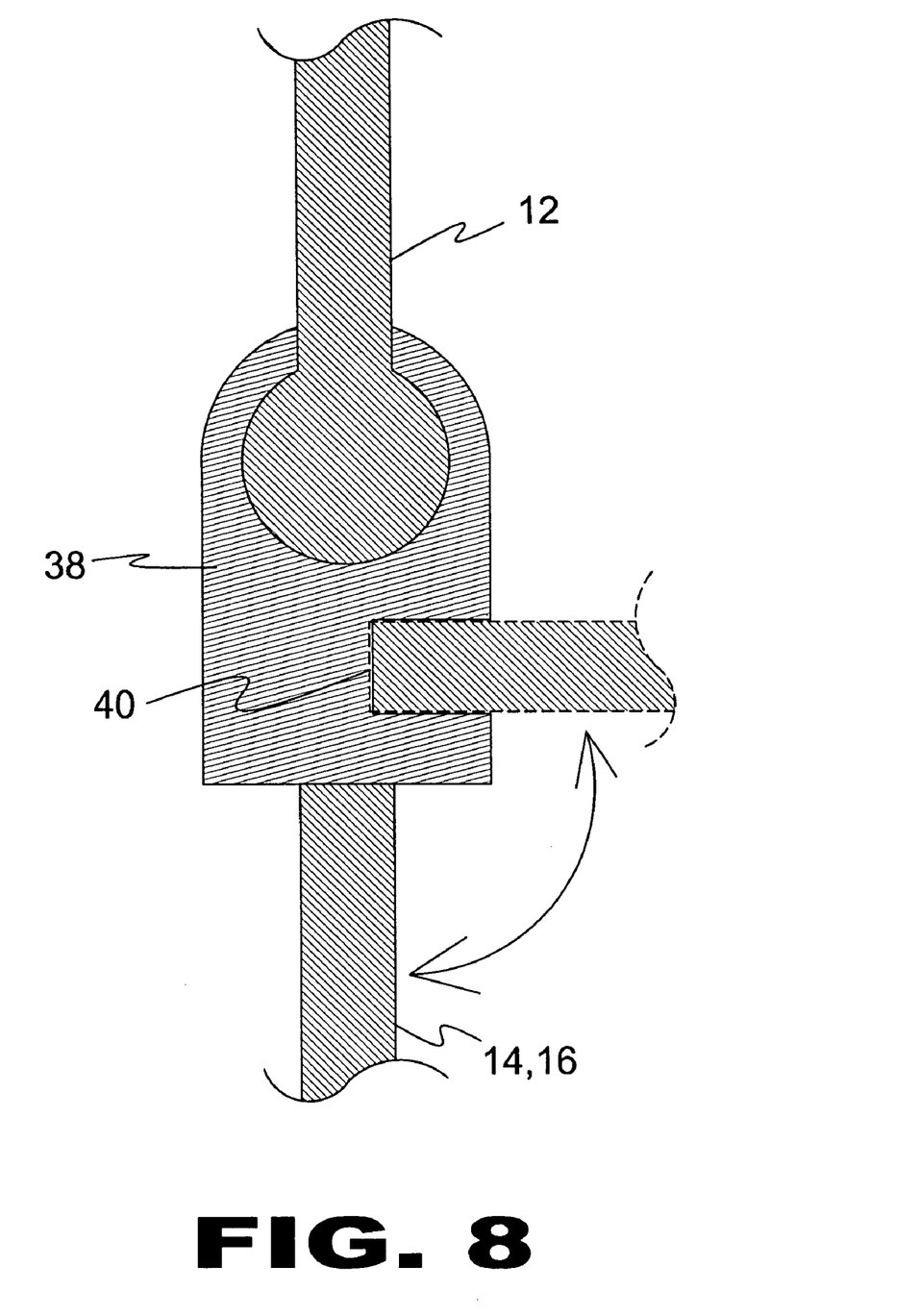
FIG. 8 is a detailed view of the locking mechanism of the present invention.

FIG. 8 is a detailed view of the locking mechanism 38 of the present invention. The locking mechanisms 38 are positioned on the corners of the middle section 12 and normally in a disengaged position so that the front 16 and rear 14 sections are free to move to a user selective engagement. To be used as a table the front 16 and rear 14 sections are moved to a right angle position relative to the middle section 12 and the locking mechanisms 38 are slidably moved toward the interior whereupon the slots 40 on the underside of the locking mechanism 38 engage the front 16 and rear 14 sections respectively in a locked position until selectively released.

Figure 9:
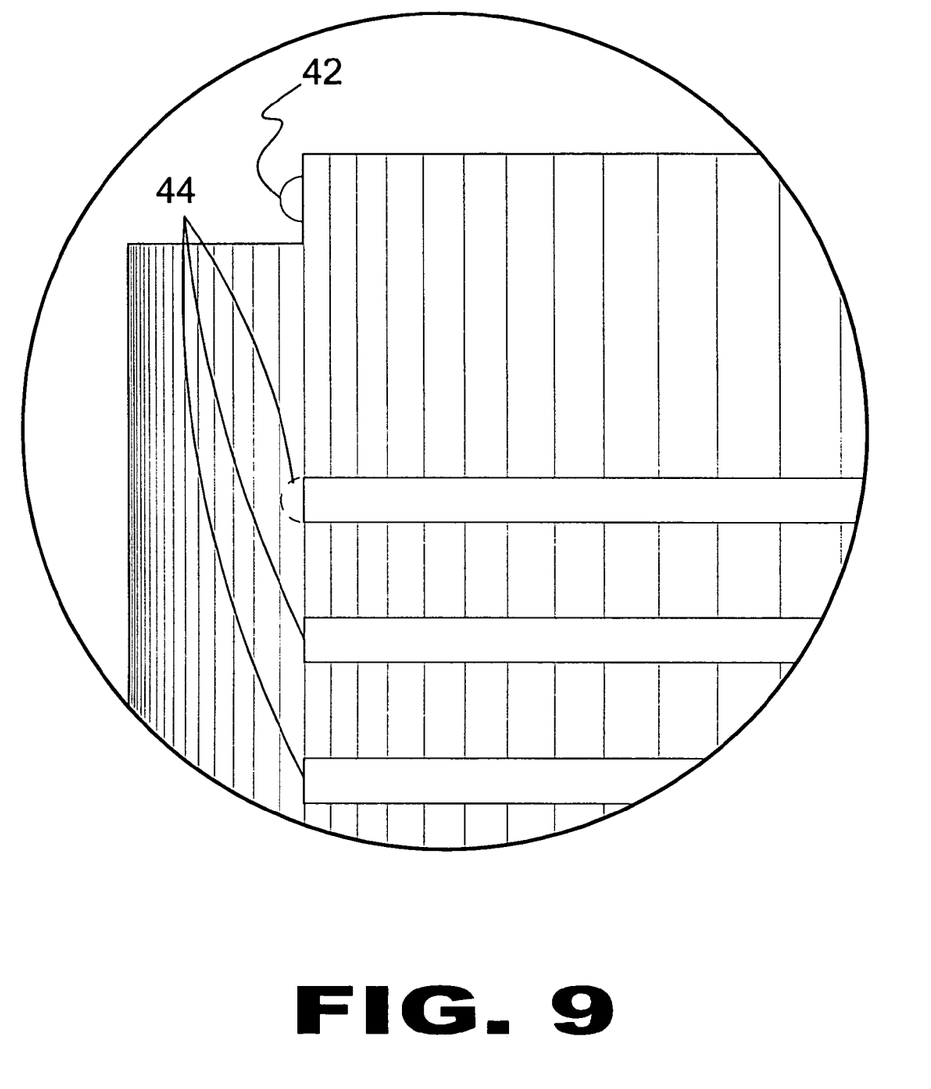
FIG. 9 is a detailed view of the present invention.

FIG. 9 is a detailed view of the present invention. Shown is an enlarged view of an outside corner occurring on both the left and right sections. Tabs having nubs 42 provide means whereby the tabs are inserted into a desired slot varying the worksurface pitch as desired. On the interior ends of each of the slots are cavities 44 for receiving the nubs keeping the engaged left and right sections from casual disengagement.

Figure 10:
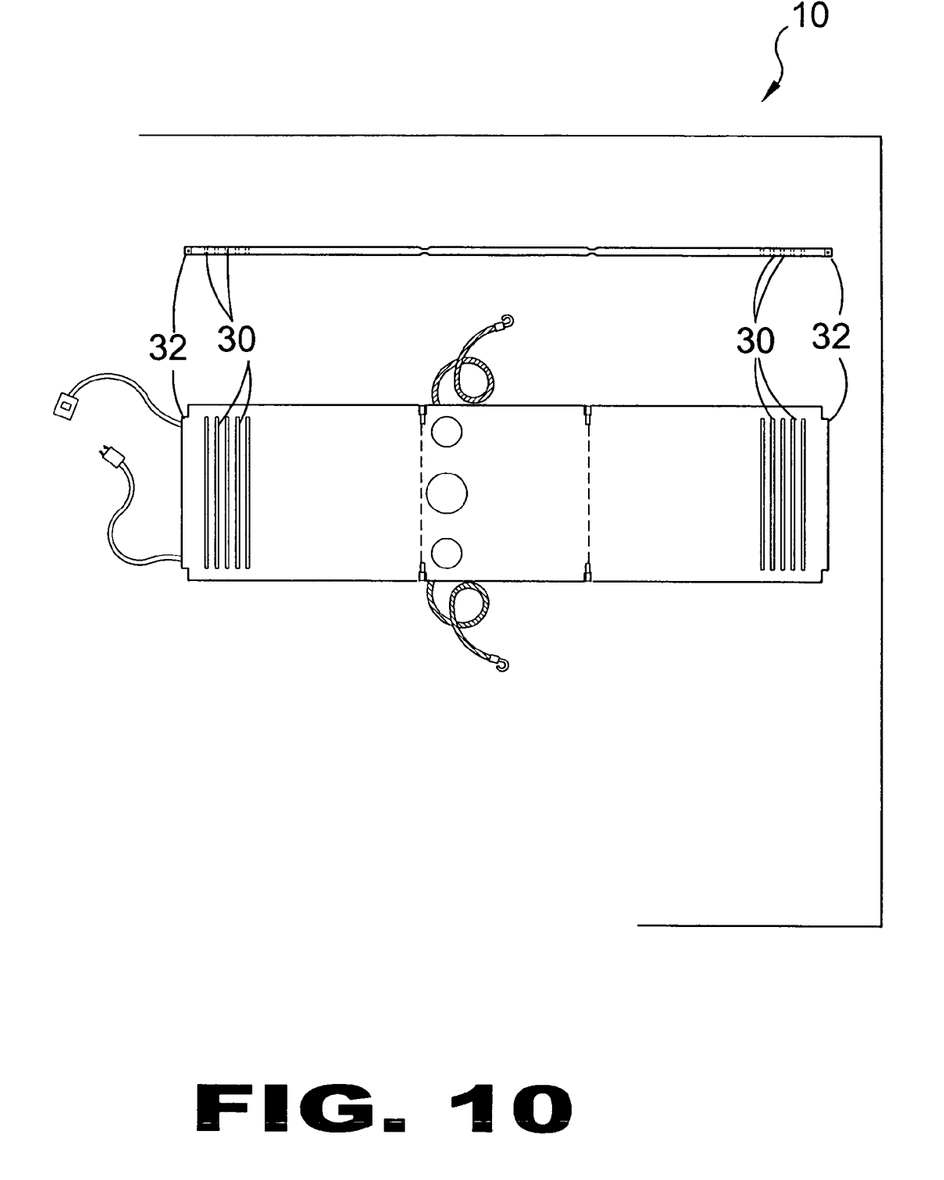
FIG. 10 is a top and side view of an alternate of the present invention.

FIG. 10 is a top and side view of an alternate of the present invention 10. Shown is a top view of an alternate of the present invention 10 having the tab receiving slots 30 extending through from top to bottom. Tongues 32 and slots 30 positioned on opposing section ends provide means for selectively varying the pitch of the worksurface.

Figure 11:
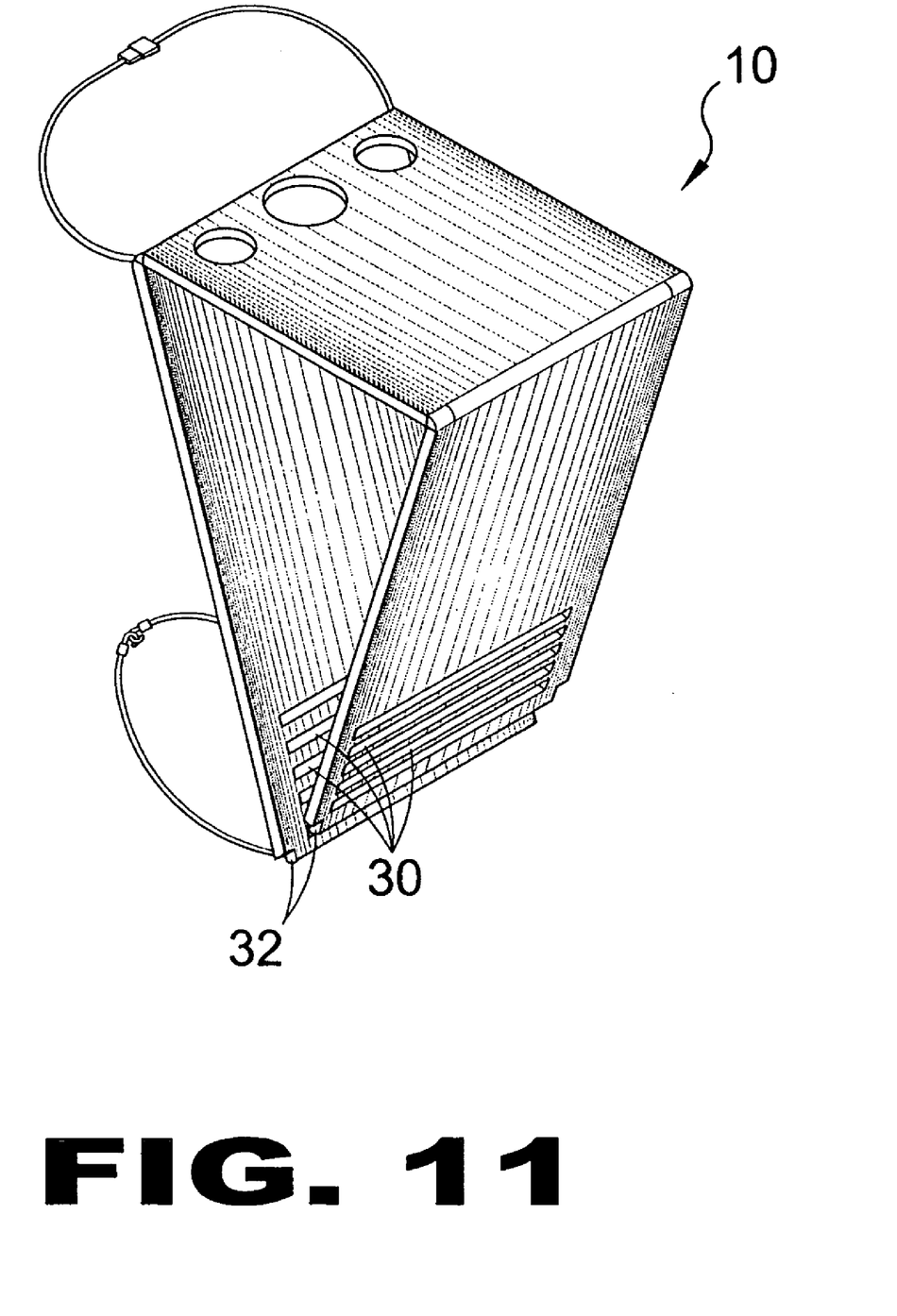
FIG. 11 is a perspective view of an alternate of the present invention.

FIG. 11 is a perspective view of an alternate of the present invention 10. Tongues 32 and slots 30 positioned on opposing section ends provide means for selectively varying the pitch of the worksurface.

Figure 12:
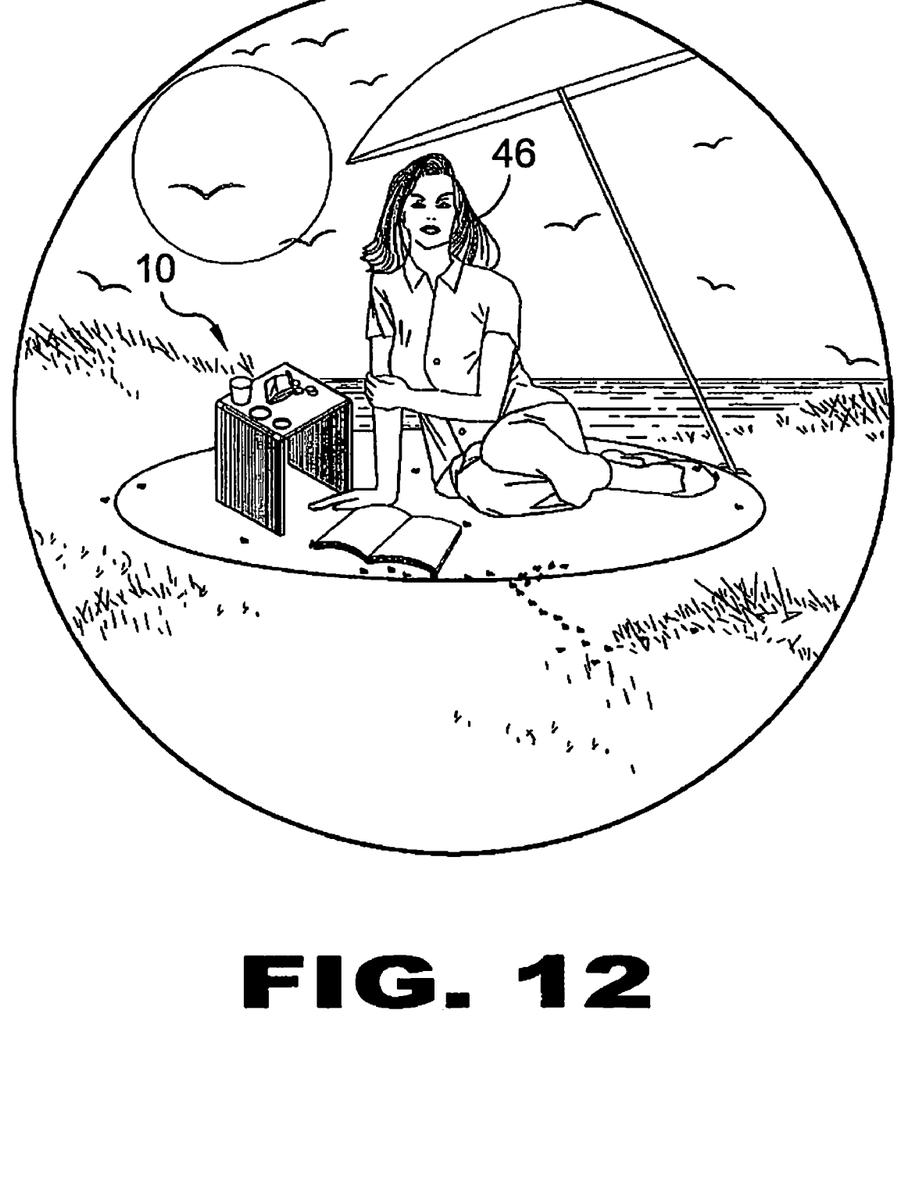
FIG. 12 is an illustrative view of the present invention in use.

FIG. 12 is an illustrative view of the present invention 10 in use as a table. The locking mechanisms positioned on the corners of the middle section are normally in a disengaged position so that the left and right sections are free to move to a user 46 selective engagement. To be used as a table the left and right sections are moved to a right angle position relative to the middle section and the locking mechanisms are moved toward the interior whereupon the slots on the underside of the locking mechanism engage the left and right sections respectively in a locked position until selectively released. While the table is shown in use at the beach, it can serve as a table in any situation where desired.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A foldable support structure apparatus comprising:
   a) a substantially planar central plate having a front end and a rear end and a plurality of apertures disposed therein;
   b) a substantially planar rear plate extending from said rear end of said central plate;
   c) a substantially planar front plate extending from said front end of said central plate;
   d) a hinge element transitionally connecting said central plate with said front plate and said second plate;
   e) means for securing said support structure to a seat in a motor vehicle;
   f) means for enabling a user to selectively adjust the pitch of said central plate when secured to said vehicle seat; and
   g) wherein said pitch adjustment means comprises elongated tongue members, one extending from the distal end of each of said front plate and said rear plate, and a plurality of mating slots disposed proximal of each of said distal ends thereof.

2. A foldable support structure apparatus as recited in claim 1, wherein said hinge element is a living hinge.

3. A foldable support structure apparatus as recited in claim 2, wherein said hinge element further includes a sliding lock mechanism to secure said first plate and said second plate at right angles with reference to said central plate.

4. A foldable support structure apparatus as recited in claim 3, wherein said front plate and said rear plate are positioned at right angles in reference to said central plate and locked into position with said sliding locks for use as a freestanding table or stand.

5. A foldable support structure apparatus as recited in claim 1, wherein said pitch adjustment means further includes nubs disposed on the sides of said tongues with mating nub socket located within said slots.

6. A foldable support structure apparatus as recited in claim 1, wherein said seat securing means includes a pair of straps extending from the proximal end of said rear plate and another pair of straps extending from the distal end.

7. A foldable support structure apparatus as recited in claim 6, wherein said straps are elastomeric.

8. A foldable support structure apparatus as recited in claim 7, wherein said straps extending from said proximal end of said rear plate serve to suspend said support structure from the headrest of the seat with the distal ends of said straps connecting to one another by means of a clip buckle.

9. A foldable support structure apparatus as recited in claim 8, wherein said straps extending from said distal end of said rear plate wrap around the seat and the distal ends thereof are secured to one another by means of a hook and eye fastener.

* * * * *